US008657626B2

(12) United States Patent
Duval et al.

(10) Patent No.: US 8,657,626 B2
(45) Date of Patent: Feb. 25, 2014

(54) CABLE CONNECTOR WITH RETAINING ELEMENT

(75) Inventors: Guy Duval, St-Jean-sur-Richelieu (CA); Luc Vézina, St-Jean-sur-Richelieu (CA)

(73) Assignee: Thomas & Betts International, Inc., Wilmington, DE (US)

( * ) Notice: Subject to any disclaimer, the term of this patent is extended or adjusted under 35 U.S.C. 154(b) by 150 days.

(21) Appl. No.: 13/288,384

(22) Filed: Nov. 3, 2011

(65) Prior Publication Data

US 2012/0142207 A1    Jun. 7, 2012

Related U.S. Application Data

(60) Provisional application No. 61/418,991, filed on Dec. 2, 2010.

(51) Int. Cl.
*H01R 9/05*    (2006.01)

(52) U.S. Cl.
USPC ............................................. 439/583

(58) Field of Classification Search
USPC ........ 439/578, 583; 29/828; 174/75 C, 66 SS
See application file for complete search history.

(56) References Cited

U.S. PATENT DOCUMENTS

| | | | |
|---|---|---|---|
| 2,816,949 A | 12/1957 | Curtiss | |
| 3,744,007 A | 7/1973 | Horak | |
| 5,059,747 A * | 10/1991 | Bawa et al. | 174/655 |
| 5,321,205 A | 6/1994 | Bawa et al. | |
| 5,529,522 A | 6/1996 | Huang | |
| 5,561,900 A * | 10/1996 | Hosler, Sr. | 29/828 |
| 5,756,972 A * | 5/1998 | Vranicar et al. | 219/541 |
| 5,766,037 A * | 6/1998 | Nelson | 439/583 |
| 5,830,009 A * | 11/1998 | Tettinger | 439/578 |
| 5,866,853 A * | 2/1999 | Sheehan | 174/653 |
| 5,951,327 A * | 9/1999 | Marik | 439/607.44 |
| 6,034,325 A | 3/2000 | Nattel et al. | |
| 6,089,912 A | 7/2000 | Tallis et al. | |
| 6,109,964 A * | 8/2000 | Kooiman | 439/583 |
| 6,267,621 B1 | 7/2001 | Pitschi et al. | |
| 6,332,808 B1 * | 12/2001 | Kanda et al. | 439/584 |

(Continued)

FOREIGN PATENT DOCUMENTS

| | | |
|---|---|---|
| CA | 1 179 029 A | 12/1984 |
| CA | 2 058 991 A1 | 12/1990 |

(Continued)

*Primary Examiner* — Renee Luebke
*Assistant Examiner* — Larisa Tsukerman
(74) *Attorney, Agent, or Firm* — Snyder, Clark, Lesch & Chung, LLP

(57) ABSTRACT

A electrical connector for terminating an electrical cable having a metallic sheath, includes a substantially tubular gland body having a central bore extending therethrough, a forward end, and a cable receiving end. A gland nut is rotatably coupled to the cable receiving end of the gland body. The gland nut is axially movable from a first position relative to the gland body to a second position relative to the gland body. A substantially tubular compression bushing is positioned between the gland nut and the gland body. A retaining element is positioned forward of the compression bushing in the central bore, wherein the retaining element comprises an annular body and a number of resilient tabs projecting inwardly from the annular body. Upon receipt of the electrical cable therein, the resilient tabs are configured to deform on engagement with the metallic sheath.

21 Claims, 6 Drawing Sheets

(56) References Cited

U.S. PATENT DOCUMENTS

| | | |
|---|---|---|
| 6,607,398 B2 | 8/2003 | Henningsen |
| RE38,294 E | 11/2003 | Nattel et al. |
| 6,705,884 B1 | 3/2004 | McCarthy |
| 6,776,657 B1 | 8/2004 | Hung |
| 6,910,919 B1 | 6/2005 | Hung |
| 7,189,114 B1 * | 3/2007 | Burris et al. ............ 439/578 |
| 7,275,957 B1 | 10/2007 | Wlos et al. |
| 7,288,002 B2 | 10/2007 | Rodrigues et al. |
| 7,435,135 B2 | 10/2008 | Wlos |
| 7,588,460 B2 | 9/2009 | Malloy et al. |
| RE41,044 E | 12/2009 | Hung |
| 7,635,283 B1 | 12/2009 | Islam |
| 7,690,945 B2 * | 4/2010 | Petersen ............ 439/584 |
| 7,892,018 B1 * | 2/2011 | Tobey ............ 439/441 |

| | | | |
|---|---|---|---|
| | 2004/0259416 A1 | 12/2004 | Kodama et al. |
| | 2007/0224880 A1 | 9/2007 | Wlos et al. |
| | 2009/0221177 A1 | 9/2009 | Brodeur |

FOREIGN PATENT DOCUMENTS

| | | |
|---|---|---|
| CA | 1 290 036 C | 10/1991 |
| CA | 2 031 590 C | 5/1994 |
| CA | 2 111 997 A1 | 6/1994 |
| CA | 2 463 221 A1 | 10/2004 |
| CA | 2 511 444 A1 | 1/2006 |
| CA | 2 531 670 A1 | 6/2006 |
| CA | 2 539 088 A1 | 9/2006 |
| CA | 2 582 792 A1 | 9/2008 |
| CA | 2 628 726 A1 | 10/2008 |

* cited by examiner

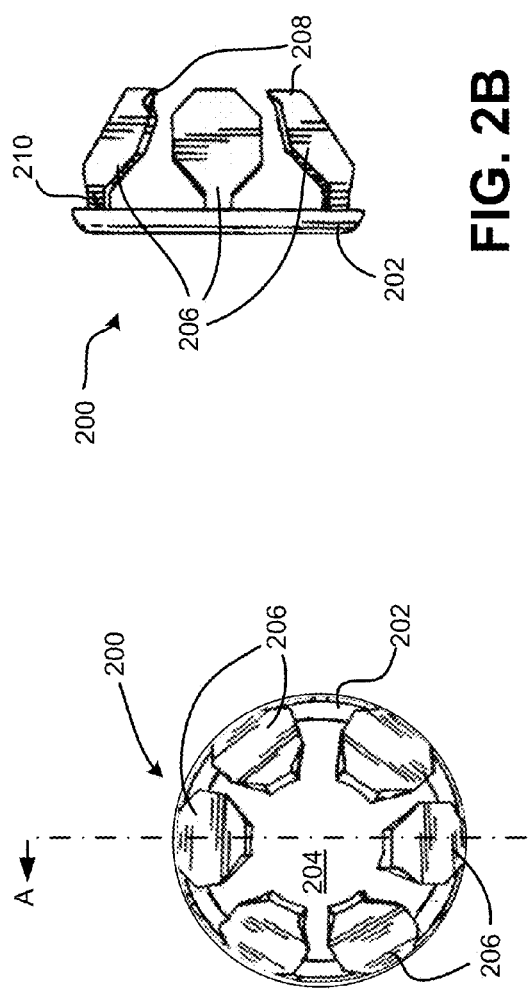
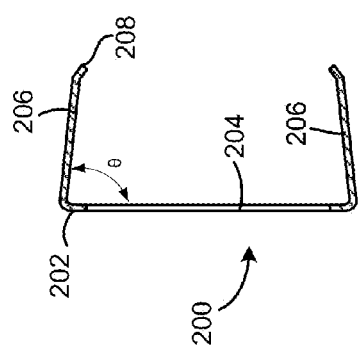
FIG. 2B
FIG. 2C
FIG. 2A

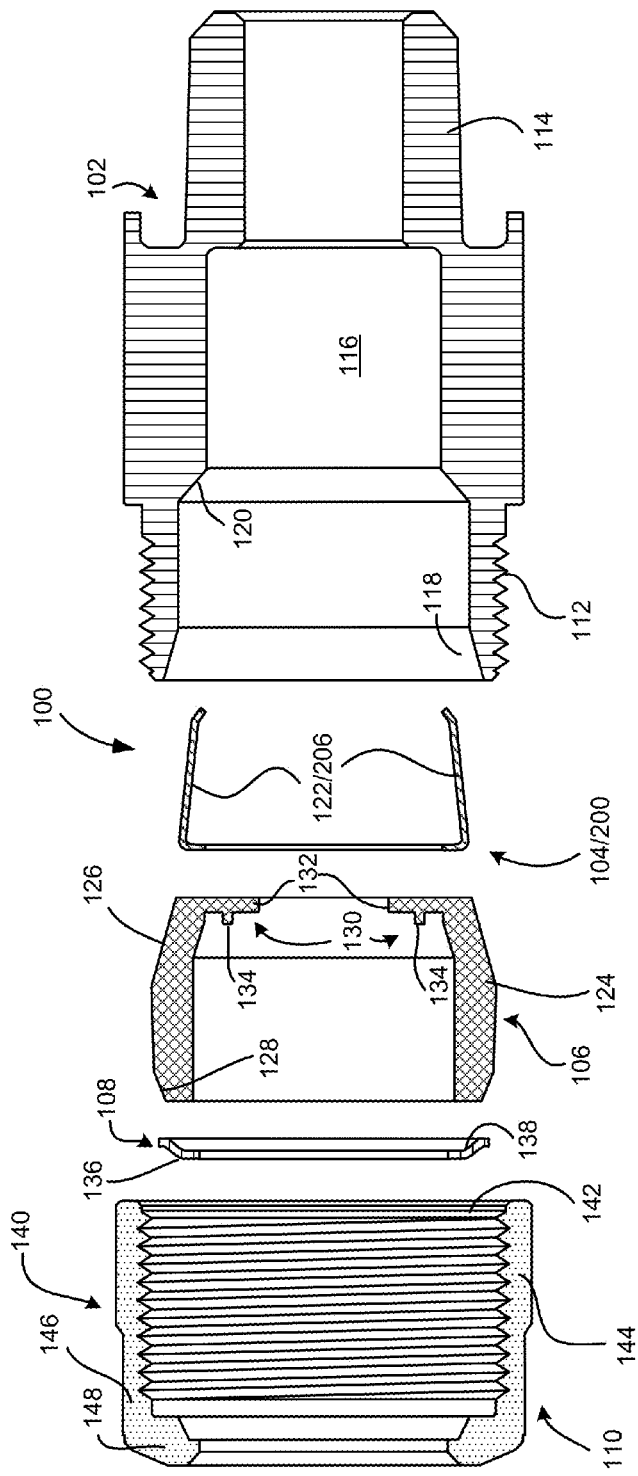
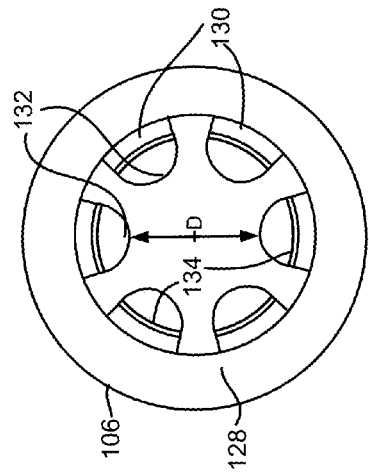
FIG. 3A
FIG. 3B

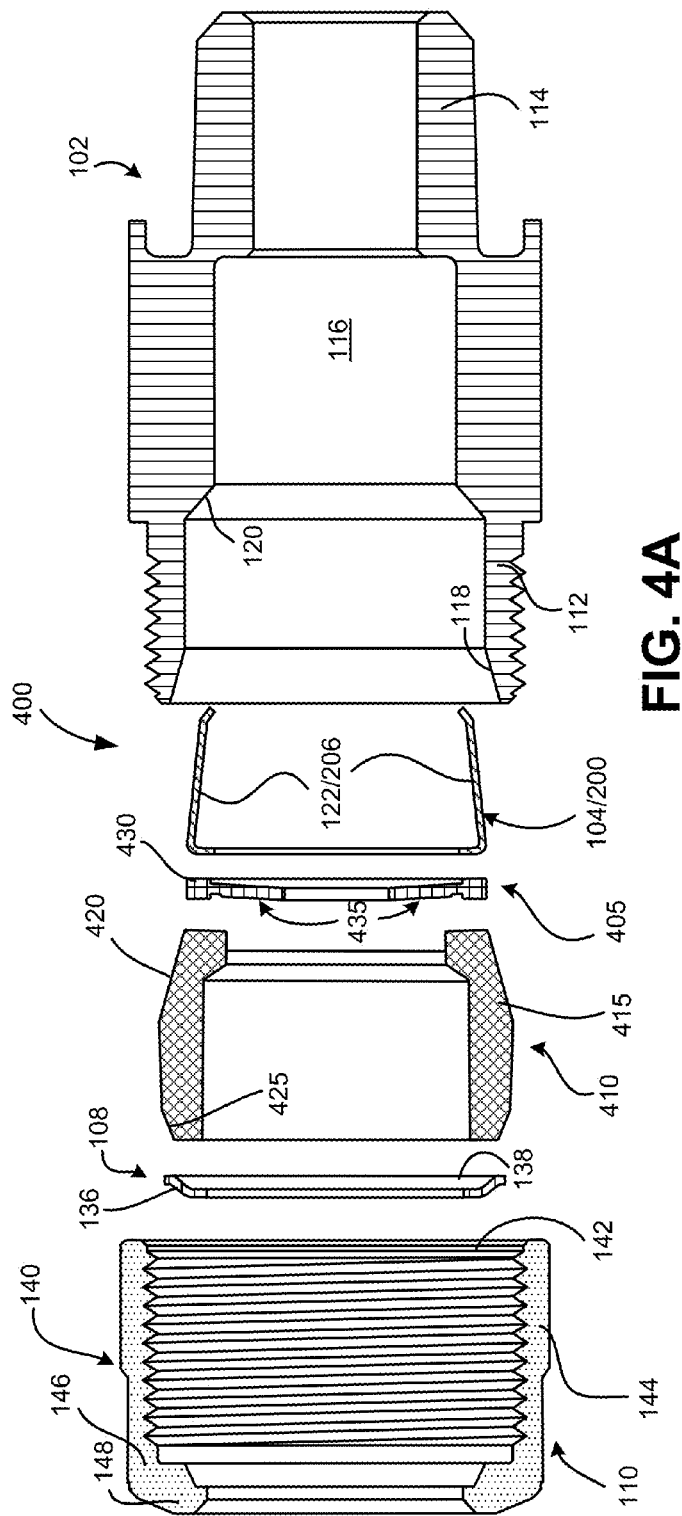
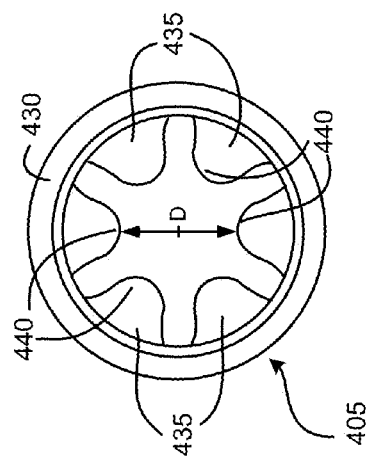
FIG. 4A
FIG. 4B

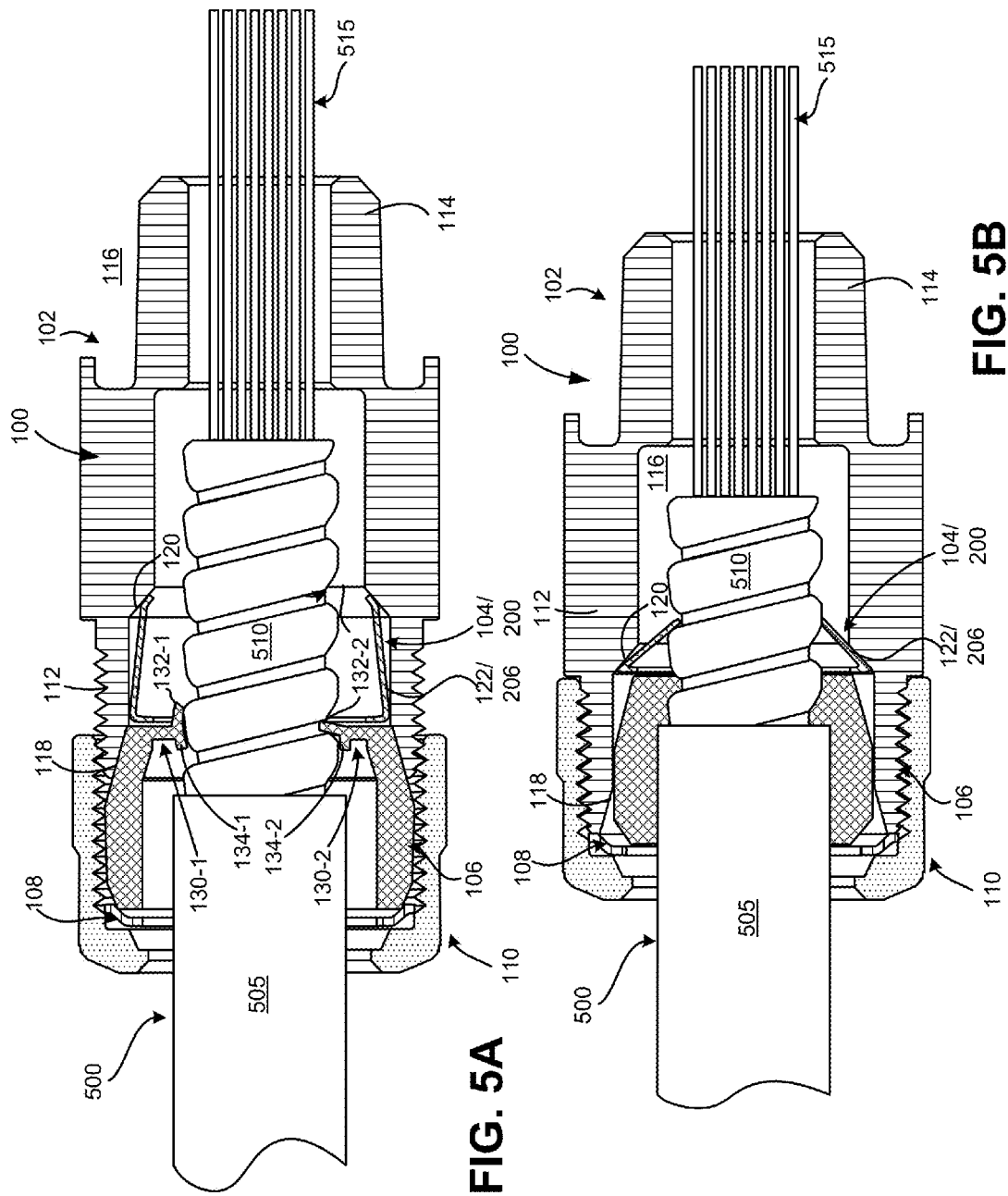

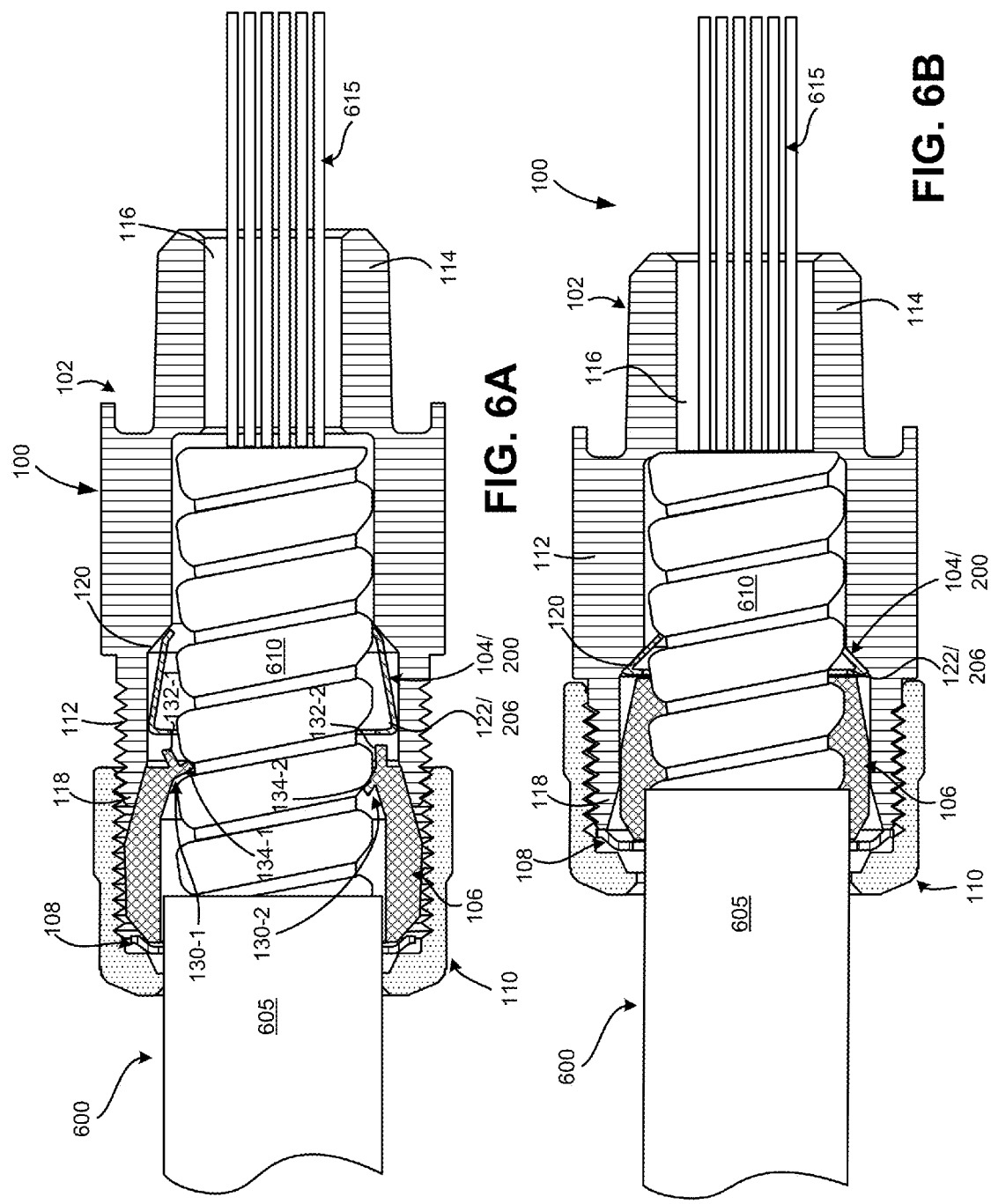

CABLE CONNECTOR WITH RETAINING ELEMENT

CROSS-REFERENCE TO RELATED APPLICATION

This application claims under 35. U.S.C. §119, based on priority to U.S. Provisional Patent Application No. 61/418,991, filed Dec. 2, 2010, the disclosure of which is hereby incorporated by reference herein.

BACKGROUND OF THE INVENTION

Electrical connectors have long been used to terminate and connect a variety of cables that carry electrical power or signals. Electrical cables are supplied in various configurations often based upon a particular use or the location in which the cables are to be used. One type of electrical cable includes a metallic sheath or cladding covered by an outer insulative layer or jacket. This type of cable may include a number of insulated conductors extending within the metallic sheath.

Connectors used to terminate these types of cables are typically configured to seal the cable to the connector and also provide for grounded electrical engagement between the metallic sheath of the cable and the body of the connector.

BRIEF DESCRIPTION OF THE DRAWINGS

FIG. 2A is a front view of another exemplary grounding element;

FIG. 2B is a side view of the grounding element of FIG. 2A;

FIG. 2C is a cross-sectional view of the grounding element of 2A, along the line A-A;

FIG. 3A is an exploded cross-sectional diagram of the cable connector of FIG. 1;

FIG. 3B is an axial view of the compression bushing of FIG. 1;

FIG. 4A is an exploded cross-sectional diagram of another exemplary electrical cable connector FIG. 4B is an axial view of the retaining element of FIG. 4A;

FIG. 5A is a cross-sectional view of the electrical cable connector of FIGS. 1-3B in an uncompressed or pre-assembled configuration;

FIG. 5B is a cross-sectional view of the electrical cable connector of FIG. 5A in a compressed or assembled configuration;

FIG. 6A is another exemplary cross-sectional view of the electrical cable connector of FIGS. 1-3B in an uncompressed or pre-assembled configuration; and FIG. 6B is a cross-sectional view of the electrical cable connector of FIG. 6A in a compressed or assembled configuration.

DETAILED DESCRIPTION OF THE PREFERRED EMBODIMENTS

Figure 1:
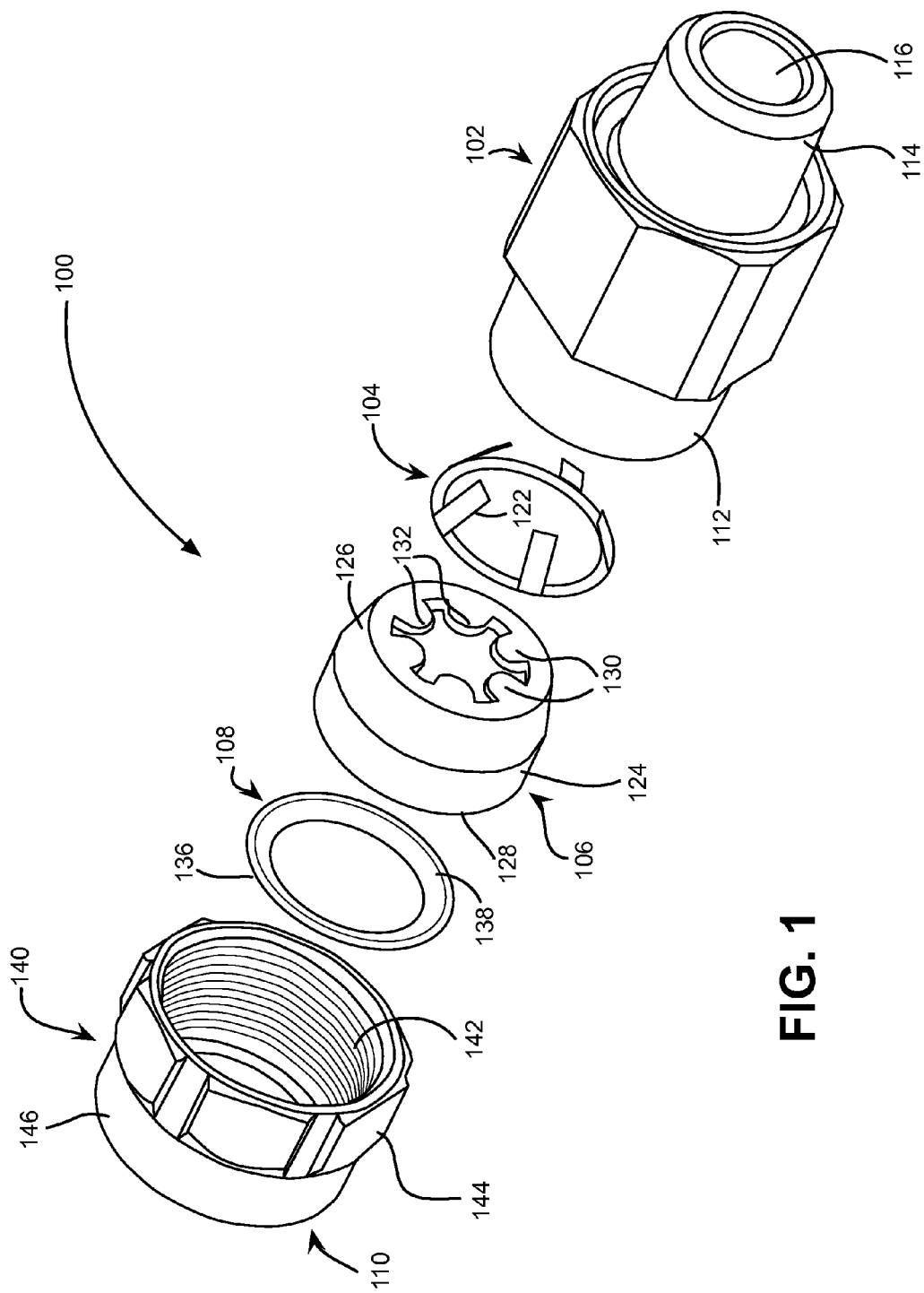
FIG. 1 is an isometric view of an exemplary embodiment of a cable connector consistent with implementations described herein.

The following detailed description refers to the accompanying drawings. The same reference numbers in different drawings may identify the same or similar elements. Also, the following detailed description does not limit the invention.

One or more embodiments disclosed herein relate to improved cable connectors for terminating metal clad cables. More specifically, the described cable connectors may include a gland body having a central bore therein. An annular compression bushing and annular retaining element are received within the central bore. Consistent with implementations described herein, the retaining element may include a number of inwardly projecting resilient tabs. Upon insertion of an electrical cable through the gland nut, a metallic sheath of the cable may engage and deflect the resilient tabs. The resilient nature of the tabs maintains the cable substantially centered within the central bore prior to compression of the compression bushing upon coupling of the gland nut to the gland body. In some implementations, the cable connector may include a grounding element for providing an electrical connection between the gland body and the metal sheath of the electrical cable.

FIG. 1A is an exploded isometric view of an exemplary embodiment of a cable connector 100. FIG. 3A is an exploded cross-sectional diagram of connector 100 of FIG. 1. As illustrated in FIGS. 1 and 3A, connector 100 may include a connector gland or gland body 102, a grounding element 104, a compression bushing 106, a slip ring 108, and a gland nut 110.

In one implementation, gland body 102 may include an elongate hollow generally tubular member having an enlarged cable receiving end 112 and a smaller opposed conductor egressing end 114. As shown, cable receiving end 112 may include external threads formed thereon for attaching to gland nut 110 in the manner described below. Conductor egressing end 114 may include external threads to facilitate attachment of connector 100 to a wall of an electrical box (not shown). Gland body 102 may include an internal central bore 116 (FIGS. 3A and 4A) extending along a central longitudinal axis between cable receiving end 112 and conductor egressing end 114. In addition, central bore 116 may include a first angled annular portion 118 for engaging compression bushing 106 and a second angled annular portion 120 for engaging grounding element 104 in the manner described below. As shown, first angled annular portion 118 may have a rearward inside diameter that is larger than a forward inside diameter, such that central bore 116 is made smaller by first angled annular portion 118 (when viewed in a forward direction). Similarly, second angled annular portion 120 may include a forward inside diameter that is smaller that its rearward inside diameter, wherein the rearward inside diameter of second angled annular portion 120 is substantially similar to the forward inside diameter of first angled annular portion 118.

As shown in FIG. 1, grounding element 104 may be configured for positioning between gland body 102 and compression busing 106 and may include a substantially annular configuration and a number of axially extending resilient contact fingers 122. In the embodiment shown in FIG. 1, grounding element 104 includes five contact fingers 122, although any suitable number of contact fingers 122 may be provided. In the manner described below, upon threading gland nut 110 to gland body 102, contact fingers 122 may be deflected inwardly by second angled annular portion 120 of central bore 116. This deflection causes contact fingers 122 to engage a metallic sheath/cladding of the electrical cable. Such engagement provides mechanical and electrical contact with the outer cladding of a cable inserted into gland nut 110/gland body 102.

FIGS. 2A-2C illustrate a front view, side view, and cross-sectional view (taken along the line A-A in FIG. 2A), respectively, of another exemplary grounding element 200 consistent with implementations described herein. As shown, grounding element 200 may include a substantially annular body 202 defining a central opening 204. A number of contact fingers 206 may extend from annular body 202 in a radially spaced configuration. As shown, contact fingers 206 may project inwardly toward central opening 204 by an angle θ. Consistent with implementations described herein, the angle θ may be sufficiently large (e.g., approaching 90°) to remove fingers 206 from engaging or interfering with an inserted cable prior to advancing gland nut 110 toward gland body 102.

As shown in FIGS. 2B and 2C, each of contact fingers 206 may include a substantially curved end portion 208 and a proximal region 210 connected to annular body 202. Curved end portions 208 may be configured to engage an outer surface of the metallic sheath of an electrical cable. In some implementations, the relative thickness of proximal region 210 may be reduced relative to a remainder of each contact finger 206. Similar to contact fingers 122 in grounding element 104, coupling gland nut 110 to gland body 102 causes deflection of contact fingers 206 upon engagement with second angled portion 120 of central bore 116.

As shown in FIGS. 2A and 2B, each of contact fingers 206 may include a generally planar octagonal shape with the curved end portions 208 bent inwardly toward central opening 204. The octagonal shape of each permanent contact finger 206 may provide tapered side walls configured to engage angled portion 120 of central bore 116 upon urging of the grounding element 200 toward conductor egressing end 114 of gland body 102. Engagement with second angled portion 120 of central bore 116 causes contact fingers 206 to deflect into engagement with the metallic sheath of the inserted cable. Although FIGS. 1 and 2A-2B depict grounding elements having a number of projecting contact fingers (122/206), in other implementations, suitable grounding elements may include other configurations, such as a helical or spring-like configuration, etc.

Referring to FIGS. 1 and 3A, compression bushing 106 may include a generally annular body 124 having a forwardly tapering frustoconical end 126 and rearwardly tapering opposed frustoconical end 128. Forward frustoconical end 126 of compression bushing 106 may be configured to engage first angled portion 118 of gland body 102 such that upon coupling of gland nut 110 to gland body 102, compression bushing 106 is urged into sealed engagement with an outer cable jacket of an inserted electrical cable to effect a seal therebetween.

Consistent with implementations described herein, forward end 126 of compression bushing 106 may include a number of inwardly projecting tabs 130. FIG. 3B is an axial view of an exemplary compression bushing 106 at rearward end 128 thereof. As shown in FIG. 3B, in one implementation, compression bushing 106 may include six tabs 130, each including a rounded end 132. Rounded ends 132 for all six tabs 130 may together define an inside diameter D that is smaller than an outside diameter of the metal cladding of an inserted electrical cable.

In addition, as shown in FIGS. 3A and 3B, each tab 130 may include a ridge 134 extending axially rearwardly in an annular manner. When viewed together, as in FIG. 3B, ridges 134 for each of tabs 130 define an inside diameter greater than diameter D defined by rounded ends 132. As described below, ridges 134 on tabs 130 may be used to grippingly engage the metal sheath of an inserted electrical cable, during insertion into gland nut 110/gland body 102.

Slip ring 108 may include a generally annular configuration having a flat forward end 136 and a rearwardly tapering frustoconical end 138. As shown in FIGS. 1 and 3A, slip ring 108 may be inserted between compression bushing 106 and gland nut 110 and may include an inside diameter sized to receive an outer jacket of an electrical cable. Upon coupling of gland nut 110 to gland body 102, slip ring 108 may be urged against compression bushing 106 and may prevent an inserted cable from rotating with respect to gland body 102.

Gland nut 110 may include a generally annular configuration having an outer surface 140 and an inner surface 142. Outer surface 140 may include a hexagonal tool engaging portion 144 on at least a portion thereof for engaging a torque applying tool, such as a wrench. Inner surface 142 may include internal threads thereon. The internal threads of gland nut 110 may be configured for cooperative engagement with the external threads on cable receiving end 112 of gland body 102. As shown in FIG. 3A, a rearward end 146 of gland nut 110 may have a flange 148 projecting inwardly therefrom. Flange 148 may be configured to abut slip ring 108 upon threaded engagement of gland nut 110 to gland body 102, thereby capturing compression bushing 106 within gland body 102 in a compressed configuration.

Consistent with implementations described herein, gland body 102, grounding element 104, and gland nut 110 may be formed of a suitable conductive metal, such as aluminum, copper, or stainless steel. Compression bushing 106 and slip ring 108 may be formed of rubber or other suitable elastomeric material.

As described in detail below, upon insertion of an armored electrical cable into gland nut 110/gland body 102, tabs 130 and ridges 134 in compression bushing 106 may engage the metal sheath/cladding on the electrical cable, thereby centering the cable within central bore 116 of gland body 102. Furthermore, the resilient nature of tabs 130 and ridges 134 in compression bushing 106 may accommodate insertion of cables of varying diameters, with larger diameter cables imparting additional amounts of deflection on tabs 130 relative to smaller diameter cables.

FIG. 4A is an exploded cross-sectional diagram of electrical cable connector 400 in another exemplary implementation. Where appropriate, the same reference numbers are used to identify the same or similar elements. As illustrated in FIG. 4A, connector 400 may include gland body 102, grounding element 104/200, a retaining element 405, a compression bushing 410, slip ring 108, and gland nut 110.

Gland body 102, grounding element 104/200, slip ring 108, and gland nut 110 may be configured substantially similarly to the same elements described above with reference to FIGS. 1-3A. Compression bushing 410 may include a generally annular body 415 having a forwardly tapering frustoconical end 420 and rearwardly tapering opposed frustoconical end 425. Forward frustoconical end 420 of compression bushing 410 may be configured to engage first angled portion 118 of gland body 102 adjacent cable receiving end 112 such that upon coupling of gland nut 110 to gland body 102, compression bushing 410 is urged into sealed engagement with an outer cable jacket of an inserted electrical cable to effect a seal therebetween.

Retaining element 405 may be configured for positioning between grounding element 104/200 and compression bushing 410 and may include a substantially annular outer portion 430 and a number of resilient tabs 435 projecting radially inward from annular outer portion 430.

FIG. 4B is an axial view of retaining element 405. As shown in FIG. 4B, in one implementation, retaining element 405 may include six resilient tabs 435, each including a rounded end 440. Similar to rounded ends 132 of compression bushing 106 described above, rounded ends 440 for all six tabs 435 may together define the inside diameter D that is smaller than an outside diameter of the metal cladding of an inserted electrical cable. In addition, in some implementations, as shown in FIG. 4A, each tab 435 may be rearwardly angled from a proximal end adjacent annular outer portion 430 toward rounded ends 440.

Similar to compression bushing 106 described above, during insertion of a metal clad electrical cable through gland nut 110 and slip ring 108, and compression bushing 410, retaining element 405 may be configured to receive an end of the cable and resiliently support the cable within central opening 116. As the electrical cable is inserted into gland body 102, resilient tabs 435 may deflect forwardly toward grounding element 104/200. The resilient nature of tabs 435 may both protect the cable from metal grounding element 104/220 and also provide flexibility in the sizes of cable accommodated within connector 400.

FIG. 5A is a cross-sectional view of the electrical cable connector of FIGS. 1-3B in an uncompressed or pre-assembled configuration. As shown in FIG. 5A, connector 100 is configured to receive a metal clad cable 500 into central bore 116. Metal clad cable 500 may have a first outside diameter and may include an outer insulative jacket 505, a scroll type metallic cladding or sheath 510, and a plurality of individually insulated electrical conductors 515. More specifically, conductors 515 may be covered by metallic sheath 510, which is in turn covered by outer insulative jacket 505. In preparation for insertion into connector 100, a portion of outer insulative jacket 505 may be removed to expose a portion of metallic sheath 510.

In an initial configuration, gland nut 110 may be coupled to gland body 102 as shown in FIG. 5A. That is, gland nut 110 may be loosely coupled to gland body 102 so as to maintain compression bushing 106 and grounding element 104/200 in a non-compressed state. As shown, insertion of cable 500 through gland nut 110 and into central bore 116 in gland body 102 causes metal sheath 510 to engage and forwardly deflect tabs 130, while maintaining cable 500 centered within central bore 116 and spaced from grounding element 104/200.

Due to the ridged and helical nature of metallic sheath 510, tabs 130 and ridges 134 may grippingly engage an outer surface of metallic sheath 510 in a variety of manners. For example, as shown in FIG. 5A, an upper tab 130-1 may be deflected such that end 132-1 is translated almost perpendicularly to the remainder of tab 130-1, while the corresponding ridge 134-1 is maintained in a substantially rearward configuration. In contrast, a lower tab 130-2 may be deflected such that end 132-2 and ridge 134-2 are only minimally deflected. As cable 500 is advanced through compression bushing 102, tabs 130 may adaptively grip and release metallic sheath 510, while maintaining cable 500 centered with central bore 116. Furthermore, the resilient nature of tabs operates to retain or hold cable 500 within connector 100 even before complete coupling of gland nut 110 to gland body and corresponding axial compression of compression bushing 106 and grounding element 104/200.

FIG. 5B is a cross-sectional view of the electrical cable connector of FIGS. 1-3B in a compressed or assembled configuration. As shown in FIG. 5B, upon threaded axial movement of gland nut 110 toward gland body 102 (e.g., via a tool), compression bushing 106 may travel axially forward relative to cable 500 and engage first angled portion 118 of gland body 102. Such engagement may cause compression bushing 106 to axially compress about outer jacket 505 and metallic sheath 510, thereby fixedly securing cable 500 within connector 100. In some implementations, the advancement of compression bushing 106 relative to cable 500 may cause tabs 130 to deflect rearwardly and form additional compression points for cable 500.

Similar to tabs 130 in compression bushing 106, fingers 122/206 of grounding element 104/200 may engage second angled surface 120 of gland body 102 upon threaded axial movement of gland nut 110 toward gland body 102. As described above, such engagement may cause fingers 122/206 to engage a portion of metallic sheath 510, thereby providing physical and electrical contact between gland body 102 and metallic sheath 510.

As briefly described above, the cable connector described herein may be adapted to accommodate various sizes of electrical cable. FIG. 6A is another cross-sectional view of the electrical cable connector of FIGS. 1-3B in an uncompressed or pre-assembled configuration. As shown in FIG. 6A, connector 100 is configured to receive a metal clad cable 600 into central bore 116 of connector 100. Metal clad cable 600 may have a second outside diameter larger than the first outside diameter of cable 500 in FIGS. 5A and 5B. Cable 600 may include outer insulative jacket 605, metallic sheath 610, and a plurality of individually insulated electrical conductors 615.

In an initial configuration, gland nut 110 may be coupled to gland body 102 as shown in FIG. 6A. That is, gland nut 110 may be loosely coupled to gland body 102 so as to maintain compression bushing 106 and grounding element 104/200 in a non-compressed state. As shown, insertion of cable 600 through gland nut 110 and into central bore 116 in gland body 102 causes metal sheath 610 to engage and forwardly deflect tabs 130, while maintaining cable 600 centered within central bore 116 and spaced from grounding element 104/200.

Given that the outside diameter of cable 600 is larger than the outside diameter of cable 500 described above, tabs 130 may be deflected to a larger degree upon insertion of cable 600 than upon insertion of cable 500. However, the resilient nature of tabs 130 may allow compression bushing 106 to accommodate the different sizes by enabled varying degrees of deflection. As cable 600 is advanced through compression bushing 102, tabs 130 may adaptively grip and release metallic sheath 610, while maintaining cable 600 centered with central bore 116.

FIG. 6B is a cross-sectional view of the electrical cable connector of FIGS. 1-3B in a compressed or assembled configuration. As shown in FIG. 6B, upon threaded axial movement of gland nut 110 toward gland body 102, compression bushing 106 may travel axially forward relative to cable 600 and engage first angled portion 118 of gland body 102. Such engagement may cause compression bushing 106 to axially compress about outer jacket 605 and metallic sheath 610, thereby fixedly securing cable 600 within connector 100. As described above in relation to cable 500, in some implementations the advancement of compression bushing 106 relative to cable 600 may cause tabs 130 to deflect rearwardly and form additional compression points for cable 600.

Upon forward movement of compression bushing 106, fingers 122/206 of grounding element 104/200 may engage second angled surface 120 of gland body 102. As described above, such engagement may cause fingers 122/206 to engage a portion of metallic sheath 610, thereby providing physical and electrical contact between gland body 102 and metallic sheath 610.

The foregoing description of exemplary embodiments provides illustration and description, but is not intended to be exhaustive or to limit the embodiments described herein to the precise form disclosed. Modifications and variations are possible in light of the above teachings or may be acquired from practice of the embodiments.

For example, various features have been mainly described above with respect to armored or metal clad electrical cables and connectors for such cables. In other embodiments, features described herein may be implemented in relation to other types of cables.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. An electrical cable connector for terminating an electrical cable having a metallic sheath, comprising:
    a substantially tubular gland body having a central bore extending therethrough, a forward end, and a cable receiving end;
    a gland nut rotatably coupled to the cable receiving end of the gland body,
    wherein the gland nut is axially movable from a first position relative to the gland body to a second position relative to the gland body;
    a substantially tubular compression bushing positioned between the gland nut and the gland body; and
    a resilient, non-conductive retaining element positioned forward of the compression bushing in the central bore, wherein the retaining element comprises an annular body and a number of resilient tabs projecting radially inwardly from the annular body, wherein the resilient tabs do not extend axially forward or rearward from the annular body, and
    wherein, upon receipt of the electrical cable by the retaining element, the resilient tabs are configured to deform on engagement with the metallic sheath.

2. The electrical cable connector of claim 1, wherein axial movement of the gland nut from the first position to the second position causes inward compression of the compression bushing to the metallic sheath to secure the electrical cable within the cable connector.

3. The electrical cable connector of claim 2, wherein the central bore includes a first angled inner surface, and
    wherein a forward portion of the compression bushing engages the first angled inner surface in the central bore when the gland nut is in the first position.

4. The electrical cable connector of claim 3, wherein the central bore comprises a second angled surface, the connector comprising:
    an annular grounding element positioned forward of the retaining element and having a number of contact fingers extending axially therefrom,
    wherein the axial movement of the gland nut to the second position causes the contact fingers to deflect inwardly to contact the metallic sheath upon engagement of the contact fingers with the second angled surface.

5. The electrical cable connector of claim 4, wherein each of the contact fingers includes a substantially curved end portion configured to engage an outer surface of the metallic sheath.

6. The electrical cable connector of claim 4, wherein the grounding element is moveable relative to gland body upon axial movement of the compression bushing.

7. The electrical cable connector of claim 1, wherein each of the resilient tabs includes a proximal end adjacent the annular body and a rounded end distal from the annular body.

8. The electrical cable connector of claim 7, wherein the rounded ends of the resilient tabs together define an inside diameter smaller than an outside diameter of the metallic sheath.

9. The electrical cable connector of claim 8, wherein the forward portion of the compression bushing comprises the retaining element.

10. The electrical cable connector of claim 8, wherein the resilient tabs project inwardly from the forward portion of the compression bushing.

11. The electrical cable connector of claim 8, wherein each of the resilient tabs comprise a rearwardly extending ridge, and
    wherein the rounded end and the rearwardly extending ridge grip the metallic sheath upon insertion of the electrical cable into the electrical cable connector.

12. An electrical cable connector for terminating an electrical cable having a conductive sheath, comprising:
    a connector body having an inside surface, a forward end, and a cable receiving end;
    a gland nut rotatably coupled to the cable receiving end of the connector body and axially movable from a first position relative to the connector body to a second position relative to the connector body;
    an annular grounding element positioned within the connector body,
    wherein the annular grounding element comprises an annular body and a number of contact fingers extending axially therefrom; and
    a compression bushing positioned between the gland nut and the connector body and configured to receive the electrical cable therein, wherein the compression bushing comprises an generally tubular body,
    wherein a forward portion of the compressing bushing comprises number of resilient tabs projecting radially inwardly from the tubular body, wherein the resilient tabs do not extend axially forward or rearward from the annular body,
    wherein, upon receipt of the electrical cable therein, the resilient tabs are configured to deform on engagement with the conductive sheath to maintain the electrical cable substantially centered within the connector body, and
    wherein axial movement of the gland nut to the second position causes the contact fingers to deflect inwardly to contact the conductive sheath upon engagement of the contact fingers with inside surface of the connector body.

13. The electrical cable connector of claim 12, wherein the compression bushing comprises a rubber or elastomer.

14. The electrical cable connector of claim 12, wherein the inside surface of the connector body includes a first angled surface for reducing a diameter of the inside surface in a forward direction and a second angled surface spaced forwardly from the first angled surface for further reducing the diameter of the inside surface in the forward direction,
    wherein the forward portion of the compression bushing engages the first angled surface when the gland nut is in the first position, and
    wherein axial movement of the gland nut to the second position causes the contact fingers to deflect inwardly to contact the conductive sheath upon engagement of the contact fingers with the second angled surface.

15. The electrical cable connector of claim 12, wherein each of the resilient tabs includes a rounded end.

16. The electrical cable connector of claim 15, wherein the rounded ends of the resilient tabs together define an inside diameter smaller than an outside diameter of the conductive sheath.

17. The electrical cable connector of claim 16, wherein each of the resilient tabs comprise a ridge projecting rearwardly from the resilient tab, and
wherein the rounded end and the rearwardly extending ridge grip the conductive sheath upon insertion of the electrical cable into the electrical cable connector to retain the electrical cable within the cable connector when the gland nut is in the first position.

18. A method for connecting an electrical cable having a metallic sheath to a cable connector, comprising:
inserting a compression element into a central bore in a substantially tubular gland body that includes a forward end and a rearward end, wherein the compression element comprises an annular body having a number of retaining tabs projecting radially inwardly from the annular body, and wherein the retaining tabs do not extend axially forward or rearward from the annular body,
loosely coupling a gland nut to the rearward end of the gland body,
wherein the gland nut comprises a substantially cylindrical annular body; and
inserting the electrical cable through the gland nut, through the compression element and into the gland body,
wherein the number of retaining tabs resiliently grip the metallic sheath of the electric cable upon insertion of the electrical cable through the compression element.

19. The method of claim 18, further comprising:
moving the gland nut forward relative to the gland body, wherein the moving causes:
compression of the annular body of the compression element to the metallic sheath through engagement of a forward portion of the compression element with an inside surface of the central bore.

20. The method of claim 18, wherein the number of retaining tabs comprise rearwardly projecting ridges for gripping the metallic sheath of the electrical cable.

21. The method of claim 18, further comprising:
inserting a conductive grounding element into the central bore in the gland body,
wherein the grounding element comprises an annular body and a number of projecting contact fingers, and
wherein the contact fingers are configured to contact an inside surface of the central bore.

* * * * *

UNITED STATES PATENT AND TRADEMARK OFFICE
CERTIFICATE OF CORRECTION

PATENT NO. : 8,657,626 B2
APPLICATION NO. : 13/288384
DATED : February 25, 2014
INVENTOR(S) : Guy Duval et al.

Page 1 of 1

It is certified that error appears in the above-identified patent and that said Letters Patent is hereby corrected as shown below:

In the Claims:

Claim 12, column 8, line 37 should read: "ing comprises a generally tubular body,"
Claim 12, column 8, line 39 should read: "comprises a number of resilient tabs projecting radially"

Signed and Sealed this
Fifth Day of August, 2014

Michelle K. Lee
*Deputy Director of the United States Patent and Trademark Office*